Patented May 23, 1933

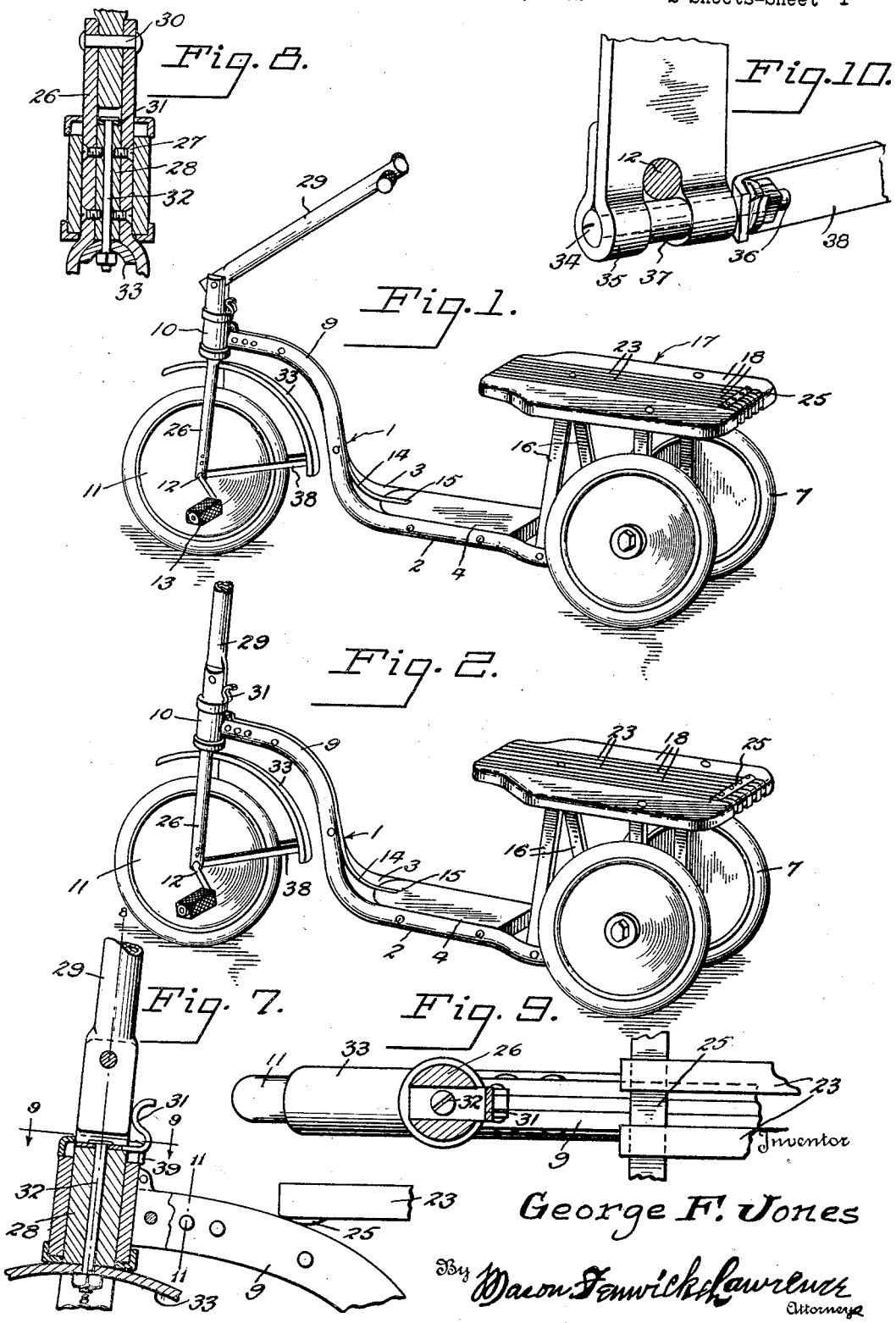

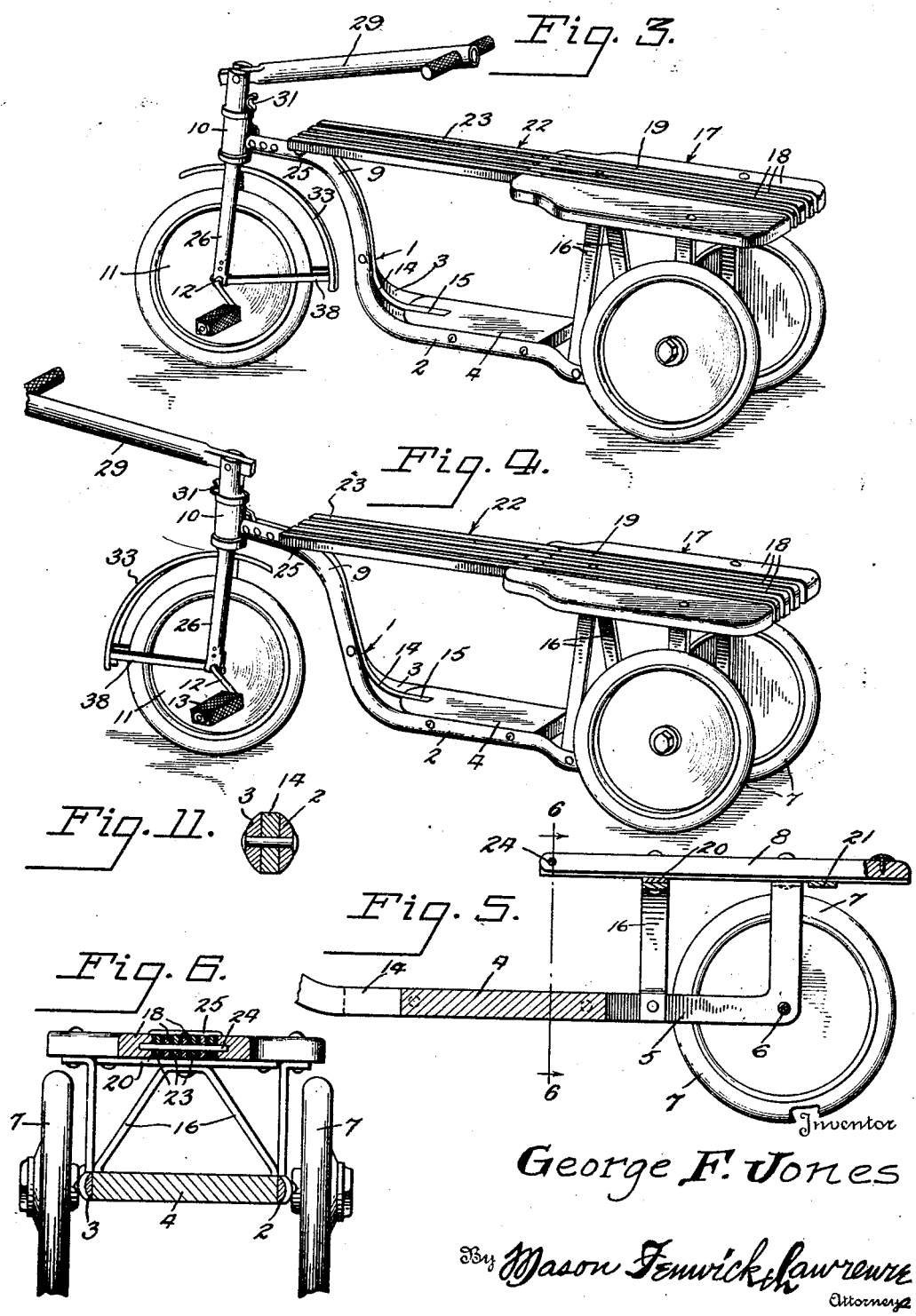

1,910,018

UNITED STATES PATENT OFFICE

GEORGE F. JONES, OF JEANNETTE, PENNSYLVANIA, ASSIGNOR TO AMY T. JONES, OF GREENSBURG, PENNSYLVANIA

TOY VEHICLE

Application filed January 18, 1932. Serial No. 587,345.

This invention relates to toy vehicles and it has for one of its objects the provision of a pedal-propelled vehicle of the scooter type having an extensible bottom whereby it may be transformed from one-passenger to two-passenger capacity.

Another object of the invention is the provision of a dirigible toy vehicle of the type described having a hinged handle so constructed that in one position of the steering column, it is stopped against swinging further forwardly than substantially vertical. This arrangement not only permits the handle to be folded down into guiding position when the vehicle is operated by pedaling or coasting either with one or two passengers, but adapts it to operation as a scooter, when the seat is in single passenger position, and the foot board thus made accessible for standing. When the steering column is reversed, the handle is then free to be swung forwardly for pulling the vehicle.

A further object of the invention is the novel construction and assemblage of the parts associated with the steering column.

Still another object of the invention is the provision of novel means for securing the pedal crank hanger in the ends of the steering fork.

Other objects of the invention relate to features of the frame construction and general assemblage of parts, all as set forth in the following specification and the accompanying drawings in which the same characters of reference have been employed throughout the several figures to designate identical parts:

Figure 1 is a perspective view of the toy vehicle, the parts being in position for operating the vehicle by pedalling or coasting, it being guided by the passenger;

Figure 2 is a similar view showing the handle in the rigid erect position in which the vehicle may be operated as a scooter;

Figure 3 is a view similar to Figure 1, showing the seat in extended position;

Figure 4 is a view similar to that of Figure 3, showing the steering column reversed so that the handle is now free to swing forwardly, in which position the vehicle may be operated by pulling;

Figure 5 is a longitudinal view partly in section showing the seat supporting construction;

Figure 6 is a cross section taken along the line 6—6 of Figure 5;

Figure 7 is a side elevation partly in section showing the construction of the steering column;

Figure 8 is a section taken along the line 8—8 of Figure 7;

Figure 9 is a section taken along the line 9—9 of Figure 7;

Figure 10 is a perspective view on an enlarged scale showing the means for securing the wheel axle or crank hanger to the front fork; and Figure 11 is a section taken along the line 11—11 of Figure 7 showing details of the frame construction.

Referring now in detail to the several figures the numeral 1 represents in general the frame of the vehicle comprising the spaced side bars 2 and 3 between which the foot board 4 is suitably secured. The side bars extend rearwardly as indicated at 5 in Figure 5, and are pierced for the reception of the rear axle 6. The side bars are extended angularly upwardly forming a support for the seat 17. The rear end of the frame is carried by wheels 7 mounted on the axle 6. Forwardly of the foot board 4, the side bars 2 and 3 coalesce to form a neck 9 which extends upwardly and forwardly, terminating in a sleeve 10 which receives the steering column, the forward portion of the frame being supported by the steering wheel 11. In that form of the invention illustrated, the steering wheel is also the driving wheel for the vehicle, being fixed to a crank hanger 12 equipped with pedals 13.

It will be noted that the frame members insofar as they have been described have the cross sectional shape of the segments of a circle as is clearly shown in Figure 11. In that portion of the frame which comprises the neck the side bars are brought together against an intermediate bar 14 and securely riveted or otherwise fixed thereto. The lower end of the intermediate bar 14 fits frictionally within a slot 15 cut in the forward end of the foot board 4. The intermediate bar 14 lends rigidity to the frame, being kept in median alinement by the foot board.

Rearwardly of the foot board convergent struts 16 are secured to the frame members, the upper ends of said struts being fixed to the seat 17.

The height of the seat is such that it lies in a plane which intersects the neck 9 of the frame near the upper portion thereof. The seat 17 is preferably formed of a plurality of separate slats or parts 18, spaced apart so as to form between them longitudinal slots 19. The parts 18 of the seat are held together by being bolted or otherwise secured to transverse metallic strips 20 and 21, one of which is utilized in the present embodiment of the invention as an anchorage plate for the struts 16.

A seat extension 22 is provided, the same comprising a plurality of slats 23 interdigitating with the slots 19 and being hingedly secured to the seat by means of a common bolt 24 passing through interdigitating ends of the slats forming said seat and said seat extension. When the seat extension is folded down the slats 23 fit within the slots 19 so that the seat extension is substantially flush with the seat 17. The forward ends of the slats forming the seat extension are preferably tied together by a transverse brace 25 which when the extension is opened out rests upon the neck 9.

The seat extension enables the vehicle to be ridden by two passengers, one of whom does the pedalling while the other keeps his feet on the foot board. When it is desired to operate the vehicle as a scooter, the seat extension is folded flush with the seat so as to make the foot board accessible for standing.

The steering column which is journalled in the sleeve 10 comprises a pair of similar fork members 26 which are secured at an intermediate portion by means such as the screws 27 to a metallic block 28 thus rigidly uniting the fork members. The unit thus formed is journalled in the sleeve 10 in the zone of the block 28 and the cross section of the unit in this zone is circular. The lower parts of the fork members 26 are spread to enable them to embrace the steering wheel 11. The upper ends of said members extend above the sleeve 10 as shown in detail in Figure 8, forming a channel between the sides of which the handle 29 is hingedly mounted by means of a rivet 30 or other suitable pivoting means, passing through the upper extensions of said fork members.

In the operation of the vehicle as a scooter it is essential that the handle 29 shall not swing forwardly beyond a position in which it is in axial alinement with the swivelling axis of the steering wheel. A limit stop is therefore provided in the form of a metallic clip 31, see Figure 7. This clip has a relatively narrow portion passing between the upper extensions of the fork members and secured by a bolt 32 passing through alined bores in said clip and through the block 28. The mud guard 33 is also held in place by the same bolt. In the position of parts shown in Figures 1, 3 and 7, the height of the clip 31 is such as to permit the handle to swing toward the seat of the vehicle without impediment. This is the position of the handle assumed when the vehicle is guided by one pedalling or coasting. The steering column is completely reversible as shown in Figure 4 so that the handle can be swung freely forwardly when it is desired to pull the vehicle.

For purpose of shipping the vehicle knocked down, and for other reasons, simple and convenient means have been provided for securing the wheel axle or crank hanger to the fork members. Figure 4 shows that the fork members are bifurcated as shown at 34 for the reception of the crank hanger 12. Alined eyes 35 are provided in the ends of the bifurcations and bolts 36 are passed through said eyes and beneath the crank hanger, said bolts serving as keepers to retain the crank hanger. Preferably cylindrical wear pieces 37 are positioned beneath the crank hanger and threaded on the bolts as the latter are passed through the eyes.

It will be understood from the above description that I have invented a four-in-one toy vehicle for one or two passengers which may be pedalled, pushed, pulled or operated as a scooter and that the invention also includes features of construction and assemblage which are not limited to a toy vehicle of the class indicated, but are applicable to any type of vehicle and it is also to be understood that the details of construction as illustrated and described are merely by way of example and not to be construed as limitative in their bearing upon the invention as claimed.

What I claim is:

1. A toy vehicle comprising a frame relatively broad at the back and forming a neck at the front, a pair of rear wheels supporting the back portion of said frame and a dirigible wheel mounted in the neck, a seat carried by the rearward part of said frame and a seat extension hingedly mounted at the front of said seat, folding relative to the latter and when extended supported at its free portion by said frame.

2. A toy vehicle comprising a frame, relatively broad at the back and forming a neck at the front, a pair of rear wheels supporting the back portion and a dirigible wheel mounted in the neck, a seat carried by the rearward part of said frame, and a seat extension hingedly mounted at the front of said seat, folding relative to the latter, and when extended supported by said neck.

3. A toy vehicle comprising a frame relatively broad at the back, and extending upwardly at the front forming a neck, a pair of rear wheels supporting the back and a dirigible wheel mounted in the neck, a seat carried in a relatively elevated position by the rearward part of said frame, and a seat extension hingedly mounted at the front of said seat, folding relatively to the latter and when extended, being supported by said neck.

4. A toy vehicle as claimed in claim 3, said seat being formed of spaced parts defining between them, longitudinal slots, and said extension being formed of spaced slats interdigitating with the parts of said seat.

5. A toy vehicle as claimed in claim 3, said seat being formed of spaced parts defining between them longitudinal slots, said extension being formed of spaced slats interdigitating with the parts of said seat and a common bolt passing transversely through the interdigitating ends of said seat parts and the slats of said extension.

6. A toy vehicle as claimed in claim 3, said seat being formed of spaced parts defining between them slots, and said extension being formed of spaced slats interdigitating with the parts of said seats, a cross-piece uniting the forward ends of said slats, said cross-piece engaging said neck when said extension is in open position.

7. A toy vehicle comprising a frame including a relatively elevated arched neck portion at its forward end and a relatively broad portion at the back, a pair of rear wheels supporting the back, and a dirigible wheel beneath said arched neck portion and swivelly mounted in said neck portion, a foot board mounted on said frame at an intermediate part in under-slung relation with respect to said dirigible wheel, a seat carried by the rearward part of said frame, and a seat extension hingedly mounted at the front of said seat and foldable relative to said seat, said extension when unfolded, overhanging said foot board and being supported at its free portion by said frame.

8. A toy vehicle as claimed in claim 7, said seat being formed of spaced parts defining between them longitudinal slots, and said extension being formed of spaced slats interdigitating with the parts of said seat, and a common bolt passing transversely through the interdigitating ends of said seat parts and the slats of said extensions.

9. A toy vehicle, as claimed in claim 7, the seat being formed of spaced parts defining between them slots, and said extensions being formed of spaced slats interdigitating with the parts of said seat, a cross-piece uniting said slats adjacent their forward ends and being supported by said neck portion when said seat extension is open.

In testimony whereof I affix my signature.

GEORGE F. JONES.